(12) United States Patent
Al-Gahtani et al.

(10) Patent No.: US 7,856,101 B2
(45) Date of Patent: Dec. 21, 2010

(54) METHOD FOR ELLIPTIC CURVE SCALAR MULTIPLICATION

(75) Inventors: Theeb A. Al-Gahtani, Dhahran (SA); Mohammad K. Ibrahim, Dhahran (SA)

(73) Assignee: King Fahd University of Petroleum and Minerals (SA)

( * ) Notice: Subject to any disclaimer, the term of this patent is extended or adjusted under 35 U.S.C. 154(b) by 988 days.

(21) Appl. No.: 11/703,228

(22) Filed: Feb. 7, 2007

(65) Prior Publication Data

US 2008/0205638 A1 Aug. 28, 2008

(51) Int. Cl.
*H04K 1/00* (2006.01)
*H04L 9/00* (2006.01)
*H04L 9/30* (2006.01)
*H04L 9/28* (2006.01)

(52) U.S. Cl. .......................................... 380/30; 380/28

(58) Field of Classification Search .................... 380/28, 380/30

See application file for complete search history.

(56) References Cited

U.S. PATENT DOCUMENTS

| | | | |
|---|---|---|---|
| 4,200,770 | A | 4/1980 | Hellman et al. |
| 5,271,061 | A | 12/1993 | Crandall |
| 5,442,707 | A | 8/1995 | Miyaji et al. |
| 5,805,703 | A | 9/1998 | Crandall |
| 6,141,420 | A | 10/2000 | Vanstone et al. |
| 6,252,959 | B1 * | 6/2001 | Paar et al. ..................... 380/28 |
| 6,738,478 | B1 | 5/2004 | Vanstone et al. |
| 6,826,586 | B2 | 11/2004 | Chang |
| 6,876,745 | B1 | 4/2005 | Kurumatani |
| 6,898,284 | B2 | 5/2005 | Solinas |
| 2002/0057796 | A1 | 5/2002 | Lambert et al. |
| 2003/0123656 | A1 | 7/2003 | Izu et al. |
| 2005/0195973 | A1 | 9/2005 | Ibrahim |
| 2006/0093137 | A1 * | 5/2006 | Izu et al. ..................... 380/30 |

FOREIGN PATENT DOCUMENTS

EP 1296224 3/2003

OTHER PUBLICATIONS

Möller, B., "Securing Elliptic Curve Point Multiplication against Side-Channel Attacks," Information Security ISC 2001, Davida & Frankel (eds.), Springer-Verlag LNCS 2200, pp. 324-334 (2001).

* cited by examiner

*Primary Examiner*—Shin-Hon Chen
(74) *Attorney, Agent, or Firm*—Richard C. Litman

(57) ABSTRACT

The method for elliptic curve scalar multiplication is a method for fast, efficient multiplication of a point on an elliptic curve by a scalar. Two different parameters are used to assign separate projective coordinates to the x-coordinate and the y-coordinate. The x- and y-coordinates are projected by $Z^{L_x}$ and $Z^{L_y}$, where $L_x$ and $L_y$ are exponential functions having a common base, i.e., $L_x = g^{n_x}$ and $L_y = g^{n_y}$, respectively. The use of projective coordinates reduces the number of inversions in scalar multiplication, thereby speeding processing time. Furthermore, since the parameters $L_x$ and $L_y$ are exponential functions, and since the base g is invariant, $g^{-1}$ can be pre-computed and stored. This practically eliminates any further inversions, since $L_x^{-1} = (g^{-1})^{n_x}$ and $L_y^{-1} = (g^{-1})^{n_y}$ so that inversions are simplified to exponentiation by substitution, further speeding processing time and reducing storage requirements.

20 Claims, No Drawings

METHOD FOR ELLIPTIC CURVE SCALAR MULTIPLICATION

BACKGROUND OF THE INVENTION

1. Field of the Invention

The present invention relates to cryptography and methods for encrypting messages for transmission over an insecure communications channel, and particularly to a method for elliptic curve scalar multiplication in a cryptographic system that uses parameterized projective coordinates.

2. Description of the Related Art

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message.

Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus, the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification. The public key is used for encryption or signature verification of a given message, and the private key is used for decryption or signature generation of the given message.

The use of cryptographic key pairs was disclosed in U.S. Pat. No. 4,200,770, issued Apr. 29, 1980 to Hellman et al., entitled "CRYPTOGRAPHIC APPARATUS AND METHOD." The '770 patent also disclosed the application of key pairs to the problem of key agreement over an insecure communication channel. The algorithms specified in the '770 patent rely for their security on the difficulty of the mathematical problem of finding a discrete logarithm. U.S. Pat. No. 4,200,770 is hereby incorporated by reference in its entirety.

In order to undermine the security of a discrete logarithm-based cryptographic algorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the cryptographic algorithm.

In particular, it is necessary that the numbers involved be large enough. The larger the numbers used, the more time and computing power is required to find the discrete logarithm and break the cryptograph. On the other hand, very large numbers lead to very long public keys and transmissions of cryptographic data. The use of very large numbers also requires large amounts of time and computational power in order to perform the cryptographic algorithm. Thus, cryptographers are always looking for ways to minimize the size of the numbers involved, and the time and power required, in performing the encryption and/or authentication algorithms. The payoff for finding such a method is that cryptography can be done faster, cheaper, and in devices that do not have large amounts of computational power (e.g., handheld smart cards).

A discrete-logarithm based cryptographic algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the cryptographic algorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

The groups referred to above come from a setting called finite fields. Methods of adapting discrete logarithm-based algorithms to the setting of elliptic curves are known. However, finding discrete logarithms in this kind of group is particularly difficult. Thus, elliptic curve-based cryptographic algorithms can be implemented using much smaller numbers than in a finite field setting of comparable cryptographic strength. Thus, the use of elliptic curve cryptography is an improvement over finite field-based public-key cryptography.

In practice, an Elliptic Curve group over Fields F(p), denoted as E(p), is formed by choosing a pair of a and b coefficients, which are elements within F(p). The group consists of a finite set of points P(x,y) that satisfy the elliptic curve equation:

$$F(x,y) = y^2 - x^3 - ax - b = 0 \quad (1.1)$$

together with a point at infinity, O. The coordinates of the point, x and y, are elements of F(p) represented in N-bit strings. In what follows, a point is either written as a capital letter, e.g., P, or as a pair in terms of the affine coordinates, i.e., (x,y).

The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points B and Q in the group, find a number k such that $B^k = Q$, where k is called the discrete logarithm of Q to the base B. Using additive notation, the problem becomes: given two points B and Q in the group, find a number k such that kB=Q.

In an Elliptic Curve Cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of elliptic curve geometric arithmetic is an operation called scalar multiplication, which computes kB by adding together k copies of the point B. Scalar multiplication is performed through a combination of point doubling and point addition operations. The point addition operation adds two distinct points together and the point doubling operation adds two copies of a point together. To compute, for example, 11B=(2*(2*(2B)))+3B=Q, it would take three point doublings and one point-addition.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition.

Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$, that is, $$(x_3,y_3)=(x_1,y_1)+(x_2,y_2) \quad (1.2)$$

TABLE I

Summary of Addition Rules

| | |
|---|---|
| General Equations | $x_3 = m^2 - x_2 - x_1$ |
| | $y_3 = m(x_3 - x_1) + y_1$ |
| Point Addition | $m = \dfrac{y_2 - y_1}{x_2 - x_1}$ |
| Point Doubling $(x_3,y_3) = 2(x_1,y_1)$ | $m = \dfrac{3x_1^2 - a}{2y_1}$ |
| $(x_2,y_2) = -(x,y_1)$ | $(x_3,y_3) = (x_1,y_1) + (-(x_1,y_1)) = O$ |
| $(x_2,y_2) = O$ | $(x_3,y_3) = (x_1,y_1) + O = (x_1,y_1)$ |
| $-(x_1,y_1)$ | $= (x_1,-y_1)$ |

Given a message point $(x_m, y_m)$, a base point $(x_B, y_B)$, and a given key, k, the cipher point $(x_C, y_C)$ is obtained using the following equation, $$(x_C,y_C)=(x_m,y_m)+k(x_B,y_B) \quad (1.3)$$

There are two basics steps in the computation of the above equations. The first is to find the scalar multiplication of the base point with the key, "$k(x_B,y_B)$". The resulting point is then added to the message point, $(x_m, y_m)$ to obtain the cipher point. At the receiver, the message point is recovered from: the cipher point, which is usually transmitted; the shared key; and the base point, that is $$(x_m,y_m)=(x_C,y_C)-k(x_B,Y_B) \quad (1.4)$$

The steps of elliptic curve symmetric cryptography can be summarized as follows. Both the sender and receiver must agree on: (1) A random number, k, that will be the shared secret key for communication; and (2) A base point, $P=(X_B, Y_B)$.

At the sending correspondent, (1) Embed a message bit string into the x coordinate of an elliptic curve point, which is designated as the message point, $(x_m, y_m)$; (2) The cipher point (xc, Yc) is computed using, $(x_c,y_c)=(x_m,y_m)+k(x_B, y_B)$; and (3) The appropriate bits of the x-coordinate and the sign bit of the y-coordinate of the cipher point $(x_c, y_c)$ are sent to the receiving entity.

At the receiving correspondent, the following steps are performed. (1) Using the shared key, k, and the base point $(x_B, y_B)$, the scalar multiplication $(x_{Bk}, y_{Bk})=k(x_B, y_B)$ is computed; (2) The message point $(x_m,y_m)$ is computed using $(x_m,y_m)=(x_c,y_c)+(-k(x_B,y_B))$; and (3) The secret message's bit string is recovered from $x_m$.

The steps of elliptic curve public-key cryptography can be summarized as follows. Both the sender and receiver must agree on (1) An elliptic curve; and (2) A base point, $P=(x_B,y_B)$. At the sending correspondent, (1) Embed a message bit string into the x-coordinate of an elliptic curve point, which is designated as the message point, $(x_m, y_m)$; (2) Using the private key of the sending correspondent, $k_{SPr}$, and the public key of the receiving correspondent, $k_{RPr}(x_b, y_b)$, compute the scalar multiplication $(x_{bk}, y_{bk})=k_{SPr}(k_{RPr}(x_b,y_b))$; (3) Compute a cipher point $(x_c,y_c)$ using $(x_c,y_c)=(X_m,y_m)+(x_{bk}, y_{bk})$, and (4) Send appropriate bits of the x-coordinate and the sign bit of the y-coordinate of the cipher point $(x_c,y_c)$ to the receiving correspondent.

At the receiving correspondent, (1) Using the private key of the receiving correspondent, $k_{RPr}$, and the public key of the sending correspondent, $k_{SPr}(x_b, y_b)$, compute the scalar multiplication $(x_{bk}, y_{bk})=k_{RPr}(k_{SPr}(x_b, y_b))$, (2) Compute the message point $(x_m,y_m)$ using $(x_m,y_m)=(x_c,y_c)-(x_c,y_c)-y_{bk}$, $Y_{bk}$); and (3) Recover the message bit string from $X_m$.

Scalar multiplication (SM) (or point multiplication) refers to computing the point:

$$KP=P+P+P+\ldots P(\text{sum taken K times})$$

on the elliptic curve over a given finite field. The integer K is referred to as "scalar" and the point P as the base point. Adding the point P to itself K times is not an efficient way to compute scalar multiplication. More efficient methods are based on a sequence of addition (ADD) and doubling (DBL) operations. The doubling operation is simply adding the point to itself.

The computation of the point KP processed by the scalar multiplication is performed using the binary expression of K represented by the equation:

$$K=k_{n-1}2^{n-1}+k_{n-2}2^{n-2}+\ldots+k_1 2+k_0$$

where $k_i$ is the i-th bit of the binary representation of K, and n is the total number of bits.

There are two main methods of calculating KP. The Least-to-Most (LM) algorithm, which starts from the least significant bit of K, and the Most-to-Least (ML) algorithm which starts from the most significant bit of K. The LM and the ML algorithms are shown below.

---
Algorithm 1: Least-to-Most Binary Method Algorithm
INPUT K, P
OUTPUT KP
---
1. Initialize Q[0] = O, Q[1] = P
2. for i=0 to n−1
3.     if k[i]==1 then
4.         Q[0]=ADD(Q[0],Q[1])
5.     end if
6.     Q[1]=DBL(Q[1])
7. end for
8. return Q[0]
---

In the LM algorithm, Q[0] is initialized to the identity point O, and Q[1] is initialized to the base point P. If $k_i=1$, the elliptic curve addition, ADD, is performed on the points Q[0] and Q[1] in step 4, and the result is stored in the point Q[0]; otherwise, (i.e., for $k_i=0$) Q[0] remains unchanged. The elliptic curve doubling, DBL, is performed on the point Q[1] in step 6, and the result is stored in the point Q[1]. This point doubling operation in step 6 is performed in all cases, regardless of the scalar bit value.

---
Algorithm 2: Most-to-Least Binary Method Algorithm
INPUT K, P
OUTPUT KP
---
1. Initialize Q[0] = P
2. for i= n−2 downto 0
3.     Q[0]=DBL(Q[0])
4.     if k[i]==1 then
5.         Q[0]=ADD(Q[0],P)
6.     end if
7. end for
8. return Q[0]
---

The ML algorithm treats the bit string of K starting with the most significant bit first. Since the most significant bit is always 1, the ML algorithm starts from the next most bit, n−2, and initializes Q[0] to P. This kind of algorithm needs only one variable, Q[0]. First, the DBL operation is performed on Q[0], and the result is stored in Q[0], as shown in step 3. This point doubling in step 3 is performed regardless of the scalar bit value. If $k_i=1$, the ADD operation is performed on the point Q[0] and the base point P in step 5, and the result is stored in point Q[0]; otherwise, (i.e. for $k_i=0$) Q[0] remains unchanged.

The difficulty in solving the elliptic curve discrete logarithm problem has been established theoretically. However, information associated with secret information, such as the private key or the like, may leak out in cryptographic processing in real mounting. Thus, there has been proposed an attack method of so-called power analysis, in which the secret information is decrypted on the basis of the leaked information.

An attack method in which change in voltage is measured in cryptographic processing using secret information, such as DES (Data Encryption Standard) or the like, so that the process of the cryptographic processing is obtained and the secret information inferred on the basis of the obtained process, is called DPA (Differential Power Analysis).

As shown in Algorithm 1 and Algorithm 2, performing the ADD operation is conditioned by the key bit. If the scalar bit value is equal to one, an ADD operation is performed; otherwise, an ADD operation is not performed. Therefore, a simple power analysis (i.e., simple side channel analysis using power consumption as the side channel) will produce different power traces that distinguish between the existence of an ADD operation or not. This can reveal the bit values of the scalar.

One widely used approach to avoid this kind of leak to perform a dummy addition in the ML method when the processed bit is '0' so that each iteration appears as a doubling followed by an addition operation, which is called the "Double-and-ADD always algorithm", shown below for the ML technique as Algorithm 3, with a similar algorithm for the LM technique shown below as Algorithm 4.

---
Algorithm 3: ML Double-and-ADD always algorithm
INPUT K, P
OUTPUT KP
---
1. Initialize Q[2]=P
2. for i=n−2 downto 0
3.     Q[0]=DBL(Q[2])
4.     Q[1]=ADD(Q[0],P)
5.     Q[2]=Q[$k_i$]
6. end for
    return Q[2]
---

---
Algorithm 4: LM Double-and-ADD always algorithm
INPUT K, P
OUTPUT KP
---
1. Initialize Q[2]=P
2. for i=n−2 downto 0
3.     Q[0]=DBL(Q[2])
4.     Q[1]=ADD(Q[0],P)
5.     Q[2]=Q[$k_i$]
6. end for
    return Q[2]
---

Another ML algorithm to avoid this kind of leak is disclosed in U.S. Patent Application No. 2003/0123656, published Jul. 3, 2003, entitled "ELLIPTIC CURVE CRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMETIC METHOD". This algorithm uses extra ADD operations to assure that the sequence of DBL and ADD operations is carried out in each iteration. We refer to this algorithm as Takagi's algorithm, shown below as Algorithm 5.

---
Algorithm 5: Takagi's ML algorithm
INPUT K, P
OUTPUT KP
---
1. INITIALIZE Q[0]=P; Q[1]=2P
2. for i=n−2 down to 0
3.     Q[2]=DBL(Q[$k_i$])
4.     Q[1]=ADD(Q[0],Q[1])
5.     Q[0]=Q[2−$k_i$]
6.     Q[1]=Q[1+$k_i$]
7. end for
    return Q[0]
---

Even if an algorithm is protected against single power analysis, it may succumb to the more sophisticated differential power analysis (DPA). Assume that the double-and-add always method is implemented with one of the previous algorithms given in Algorithms 3, 4 or 5. Representing the scalar value K in binary:

$$K = k_{n-1}2^{n-1} + k_{n-2}2^{n-2} + \ldots + k_1 2 + k_0$$

where $k_i$ is the i-th bit of the binary representation of K, and n is the total number of bits. DPA is based on the assumption that an attacker already knows the highest bits, $k_{n-1}, k_{n-2}, \ldots k_{j+1}$ of K. Then, he guesses that the next bit $k_j$ is equal to '1', and then randomly chooses several points $P_1, \ldots, P_t$ and computes:

$$Q_r = \left(\sum_{i=j}^{n-1} k_i 2^{i-j}\right) P_r \text{ For } 1 \leq r \leq t$$

Based on statistical analysis of these points (i.e., $Q_r$, $1 \leq r \leq t$), he can decide whether his guess is correct or not. Once $k_j$ is known, the remaining bits, $k_{j-1}, k_{j-2}, \ldots k_0$, are recovered recursively in the same way.

J. Coron proposed the following randomization-based countermeasures, which are effective against differential power analysis attacks: (1) Randomizing the base-point P by computing Q=kP as Q=(P+R)−kR for a random point R; (2) Using randomized projective coordinates, i.e., for a random number r≠0, the projective coordinates, (X,Y,Z) and (rX, rY, rZ) represent the same point, so that for a random number r, if P=($x_0, y_0$), Q is computed as Q=k($rx_0, ry_0,: r$); (3) Randomizing the scalar K, i.e., if n=$\text{ord}_E(P)$ denotes the order of P∈E(F(p)), then Q is computed as Q=(k+rn)P for a random r, or, alternatively, one can replace n by the order of the elliptic curve, #E(F(p)).

These countermeasures can be used with Coron's algorithm or Takagi's algorithm to protect scalar multiplication computation against both simple power attacks and differential power analysis attacks.

One of the crucial decisions when implementing an efficient elliptic curve cryptosystem over GF(p) is deciding which point coordinate system to use. The point coordinate system used for addition and doubling of points on the elliptic curve determines the efficiency of these routines, and hence the efficiency of the basic cryptographic operation, scalar multiplication There are many techniques proposed for fast implementations of elliptic curve cryptosystems. One of the most important techniques that can be used to enhance scalar multiplication is the idea of transferring the point coordinates into other coordinates that can eliminate the inverse operation.

Various coordinates can be used in order to eliminate the inverse operation in scalar multiplication and, hence, increase the speed of calculations. We still need one final inverse operation to return back to the normal (Affine) coordinates after completing scalar multiplication. There are potentially five different coordinate systems, which can be summarized as: Affine (A), Projective (P), Jacobian (J), Chudnovsky-Jacobian (C), and Modified (M) coordinates. The computation times in terms of number of multiplication (M), squaring (S), and inverse (I) operations are computed for each coordinate system. For simplicity, the addition and subtraction operations are not considered, since they require very little time.

Affine Coordinates (A)

Affine coordinates are the simplest to understand and are used for communication between two parties because they require the lowest bandwidth. However, the modular inversions required when adding and doubling points that are represented using Affine coordinates cause them to be highly inefficient for use in addition and doubling of points. The other coordinate systems require at least one extra value to represent a point and do not require the use of modular inversions in point addition and doubling, but extra multiplication and squaring operations are required instead.

For Affine coordinates, let $$\text{ECE}: y^2 = x^3 + ax + b (a,b \in F_p, 4a^3 + 27b^2 \neq 0) \qquad 3.1$$

be the equation of elliptic curve E over $F_p$. This equation will be referred to as ECE.

Let P=($x_1,y_1$), Q=($x_2,y_2$) be points on E. It is desired to find R=P+Q=($x_3,y_3$). The affine formulas for addition are given by:

$$x_3 = \lambda^2 - x_1 - x_2$$

$$y_3 = \lambda(x_1 - x_3) - y_1$$

Where:

$$\lambda = (y_2 - y_1)/(x_2 - x_1) \qquad 3.2$$

and where P≠Q. The affine formulas for point doubling (R=2P) are given by:

$$x_3 = \lambda^2 - 2x_1$$

$$y_3 = \lambda(x_1 - x_3) - y_1$$

Where:

$$\lambda = (3x_1^2 + a)/(2y_1) \qquad 3.3$$

Projective Coordinates (P)

In projective coordinates, the following transformation is used:

$$x = \frac{X}{Z}$$
and
$$y = \frac{Y}{Z}$$

The ECE becomes:

$$Y^2 Z = X^3 + aXZ^2 + bZ^3 \qquad 3.4$$

In this case, the points P,Q, and R are represented as follows:

$$P=(X_1,Y_1,Z_1), Q=(X_2,Y_2,Z_2) \text{ and } R=P+Q=(X_3,Y_3,Z_3)$$

The addition formulas where P≠Q are given by:

$$X_3 = vA, Y_3 = u(v^2 X_1 Z_2 - A) - v^3 Y_1 Z_2, Z_3 = v^3 Z_1 Z_2 \qquad 3.5$$

where:

$$u = Y_2 Z_1 - Y_1 Z_2, v = X_2 Z_1 - X_1 Z_2 \text{ and } A = u^2 Z_1 Z_2 - v^3 - 2v^2 X_1 Z_2$$

The doubling formula is given by:

$$X_3 = 2hs, Y_3 = w(4b - h) - 8Y_1^2 s^2, Z_3 = 8s^3 \qquad 3.6$$

where $$w = aZ_1^2 + 3X_1^2, s = Y_1 Z_1, B = X_1 Y_1 s \text{ and } h = w^2 - 8B$$

Jacobian Coordinates (J)

In Jacobian coordinates, the following transformation is used:

$$x = \frac{X}{Z^2}$$

and $$y = \frac{Y}{Z^3}$$

The ECE becomes:

$$Y^2 = X^3 + aXZ^4 + bZ^6$$

In this case, the points P, Q, and R have three coordinates X, Y, and Z as follows:

$$P=(X_1,Y_1,Z_1), Q=(X_2,Y_2,Z_2), \text{ and } R=P+Q=(X_3,Y_3,Z_3)$$

The addition formula, where $P \neq Q$, is given by:

$$X_3 = -H^3 - 2U_1H^2 + r^2, Y_3 = -S_1H^3 + r(U_1H^2 - X_3), Z_3 = Z_1Z_2H \qquad 3.7$$

where:

$$U_1 = X_1Z_2^2, U_2 = X_2Z_1^2, S_1 = Y_1Z_2^3, S_2 = Y_2Z_1^3, H = U_2 - U_1, \text{ and } r = S_2 - S_1$$

The doubling formula is given by:

$$X_3 = T, Y_3 = -8Y_1^2 + M(S-T), Z_3 = 2Y_1Z_1 \qquad 3.8$$

where $$S = 4X_1Y_1^2, M = 3X_1^2 + aZ_1^4, \text{ and } T = -2S + M^2$$

Chudnovsky-Jacobian Coordinates (C)

It is clear that Jacobian coordinates provide faster doubling and slower addition compared to projective coordinates. In order to speedup addition, D. V. Chudnovsky proposed the Chudnovsky-Jacobian coordinates. In this coordinate system, a Jacobian point is represented internally as 5-tupel point (X, Y, Z, $Z_2$, $Z_3$). The transformation and ECE equations are the same as in Jacobian coordinates, while the points P,Q, and R represented as follows:

$$P=(X_1,Y_1,Z_1,Z_1^2,Z_1^3), Q=(X_2,Y_2,Z_2,Z_2^2,Z_2^3), \text{ and}$$

$$R=P+Q=(X_3,Y_3,Z_3,Z_3^2,Z_3^3)$$

The main idea in Chudnovsky-Jacobian coordinate is that the $Z_2$, $Z_3$ are ready for use from the previous iteration and there is no need to re-calculate them. In other words, $Z_1^2$, $Z_1^3$, $Z_2^2$, $Z_1^3$, are computed during the last iteration and fed to the current iteration as inputs, while $Z_3^2$, $Z_3^3$ need to be calculated.

The addition formula for Chudnovsky-Jacobian coordinates, where P#Q, is given by:

$$X_3 = -H^3 - 2U_1H^2 + r^2, Y_3 = -S_1H^3 + r(U_1H^2 - X_3), Z_3 = Z_1Z_2Z_3 = Z_3^2, Z_3^3 = Z_3^3 \qquad 3.9$$

where:

$$U_1 = X_1Z_2^2, U_2 = X_2Z_1^2, S_1 = Y_1Z_2^3, S_2 = Y_2Z_1^3, H = U_2 - U_1, \text{ and } r = S_2 - S_1$$

The doubling formula (R=2P) for Chudnovsky-Jacobian coordinates is given by:

$$X_3 = T, Y_3 = -8Y_1 + M(S-T), Z_3 = 2Y_1Z_3^2 = Z_3^2, Z_3^3 = Z_3^3 \qquad 3.10$$

where:

$$S = 4X_1Y_1^2, M = 3X_1^2 + a(Z_1^2)^2, \text{ and } T = -2S + M^2$$

Modified Jacobian Coordinates (M)

Henri Cohen et. al. modified the Jacobian coordinates and claimed that the modification resulted in the fastest possible point doubling. The term ($aZ^4$) is needed in doubling, rather than in addition. Taking this into consideration, the modified Jacobian coordinates employed the same idea of internally representing this term and providing it as input to the doubling formula. The point is represented in 4-tuple representation (X, Y, Z, $aZ^4$). It uses the same transformation equations used in Jacobian coordinates.

In modified Jacobian coordinates, the points P, Q, and R are represented as follows:

$$P=(X_1,Y_1,Z_1,aZ_1^4), Q=(X_2,Y_2,Z_2,aZ_2^4), \text{ and } R=P+Q=(X_3,Y_3,Z_3,aZ_3^4)$$

In modified Jacobian coordinates, the addition formula, where $P \neq Q$, is given by:

$$X_3 = -H^3 - 2U_1H^2 + r^2, Y_3 = -S_1H^3 + r(U_1H^2 - X_3), Z_3 = Z_1Z_2HaZ_3^4 = aZ_3^4 \qquad 3.11$$

where:

$$U_1 = X_1Z_2^2, U_2 = X_2Z_1^2, S_1 = Y_1Z_2^3, S_2 = Y_2Z_1^3, H = U_2 - U_1, \text{ and } r = S_2 - S_1$$

The doubling formula in modified Jacobian coordinates is given by:

$$X_3 = T, Y_3 = M(S-T) - U, Z_3 = 2Y_1Z_3aZ_3^4 = 2U(aZ_1^4) \qquad 3.12$$

where:

$$S = 4 \times X_1Y_1, U = 8Y_1^4, M = 3X_1^2 + aZ_1^4, \text{ and } T = -2S + M^2$$

In spite of these advances, an inversion is still required to convert the product of scalar multiplication back to affine coordinates. Thus, a method for elliptic curve scalar multiplication solving the aforementioned problems is desired.

SUMMARY OF THE INVENTION

The method for elliptic curve scalar multiplication is a method for fast, efficient multiplication of a point on an elliptic curve by a scalar. Two different parameters are used to assign separate projective coordinates to the x-coordinate and the y-coordinate. The x- and y-coordinates are projected by $Z^{L_x}$ and $Z^{L_y}$, where $L_x$ and $L_y$ are exponential functions having a common base, i.e., $L_x = g^{n_x}$ and $L_y = g^{n_y}$, respectively. The use of projective coordinates reduces the number of inversions in scalar multiplication, thereby speeding processing time. Furthermore, since the parameters $L_x$ and $L_y$ are exponential functions, and since the base g is invariant, $g^{-1}$ can be pre-computed and stored. This practically eliminates any further inversions, since $L_x^{-1} = (g^{-1})^{n_x}$ and $L_y^{-1} = (g^{-1})^{n_y}$ so that inversions are simplified to exponentiation by substitution, further speeding processing time and reducing storage requirements.

This feature, i.e., computing $L_x^{-1}$ and $L_y^{-1}$ without any inversion operation, is used to introduce new countermeasures against DPA attacks by randomizing the projective coordinate system during the main loop of scalar multiplication. In conventional systems, it is well known that changing the projective coordinate system halfway through the scalar multiplication computation requires at least one inversion operation each time we want to change the coordinate system. However, in the method of the present invention, it is possible to convert an elliptic curve point from one projective coordinate system to another during the same scalar multiplication procedure without any inversion operation. The only inversion operation required is for computing $g^{-1}$, which can be computed once and stored for later use for point conversion during the same scalar multiplication.

The method includes two processes for converting an elliptic curve point $P_1 = (X_1, Y_1, Z^{L_{x1}}, Z^{L_{y1}})$ to another projected point $P_2 = (X_2, Y_2, Z^{L_{x2}}, Z^{L_{y2}})$. Both processes convert $P_1$ directly to $P_2$ without any inversion operation; in other words, without the need to calculate the affine coordinates x and y of $P_1$ and then project them to $P_2$. These processes differ in whether the Z-coordinate is calculated or not.

Recall that we have $Z^{L_{x1}}$ and $Z^{L_{y1}}$ in the representation of the point $P_1$ (not the Z-coordinate). The first process is based on calculating the Z-coordinate first and then use it to get $Z^{L_{x2}}, Z^{L_{y2}}, X_2$ and $Y_2$. This process requires computing either $L_x^{-1}$ or $L_y^{-1}$. The second process does not require calculating the Z-coordinate. It uses $Z^{L_{x1}}$ and $Z^{L_{y1}}$ to get $Z^{L_{x2}}, Z^{L_{y2}}, X_2$ and $Y_2$ directly without calculating the value of Z This process requires both $L_x^{-1}$ and $L_y^{-1}$ to be computed. However, whether both $L_x^{-1}$ and $L_y^{-1}$ are required or whether one of them is sufficient, they can be calculated without any inversion operation according to $L_x^{-1} = (g^{-1})^{n_x}$ and $L_y^{-1} = (g^{-1})^{n_y}$.

The projecting parameters $L_x$ and $L_y$ are degrees of the Z-coordinate that can be chosen in the range from 1 to N. Based on that, the following Parameterized Transformation Functions are defined:

$$x = \frac{X}{Z^{L_x}} \qquad 4.3a$$

$$y = \frac{Y}{Z^{L_y}} \qquad 4.3b$$

where $0 < L_x \leq N$ and $0 \leq L_y \leq N$.

The method includes equations for elliptic curve point addition and doubling that can be used for any values for $L_x$ and $L_y$, and, hence, the same mathematical formulation can be used to implement point addition and doubling using any projective coordinate. The appropriate projective coordinate is selected based on the values of projecting parameters $L_x$ and $L_y$.

These and other features of the present invention will become readily apparent upon further review of the following specification

DETAILED DESCRIPTION OF THE PREFERRED EMBODIMENTS

The present invention is a method for elliptic curve scalar multiplication that is a method for fast, efficient multiplication of a point on an elliptic curve by a scalar. Two different parameters are used to assign separate projective coordinates to the x-coordinate and the y-coordinate. The x- and y-coordinates are projected by $Z^{L_x}$ and $Z^{L_y}$ where $L_x$ and $L_y$ are exponential functions having a common base, i.e., $L_x = g^{n_x}$ and $L_y = g^{n_y}$, respectively. The use of projective coordinates reduces the number of inversions in scalar multiplication, thereby speeding processing time. Furthermore, since the parameters $L_x$ and $L_y$ are exponential functions, and since the base g is invariant, $g^{-1}$ can be precomputed and stored. This practically eliminates any further inversions, since $L_x^{-1} = (g^{-1})^{n_x}$ and $L_y^{-1} = (g^{-1})^{n_y}$ so that inversions are simplified to exponentiation by substitution, further speeding processing time and reducing storage requirements.

The present invention discloses a new method for computing the projecting parameters $L_x$ and $L_y$. This method involves defining $L_x$ and $L_y$ as functions of a base value g and powers $n_x$ and $n_y$ for computing $Z^{L_x}$ and $Z^{L_y}$, respectively. This feature allows the dynamic variation of the projective coordinate used in the same scalar multiplication without the need for inversion operations.

According to the method, $L_x$ and $L_y$ are defined as follows:

$$L_x = g^{n_x} \qquad 4.1a$$

$$L_y = g^{n_y} \qquad 4.1b$$

Defining $L_x$ and $L_y$ in this way allows the computing/encrypting device to select the value of g either at random or according to a certain rule, such as being 2 or power of 2. Also, it is now possible to compute $L_x$ and $L_y$ themselves in a more powerful and efficient way, since g can be selected in a way that can speedup the computations. $n_x$ and $n_y$ are powers that can be chosen either at random or according to a certain criteria, such as a criteria for reducing computation complexity.

However, a very important feature of defining $L_x$ and $L_y$ as in equations 4.1a and 4.1b is that it is possible to compute $L_x^{-1}$ and $L_y^{-1}$ without any inversion operation whenever they are needed, since $g^{-1}$ can be precomputed and stored. Therefore, $L_x^{-1}$ and $L_y^{-1}$ can be computed as follows:

$$L_x^{-1} = (g^{-1})^{n_x} \qquad 4.2a$$

$$L_y^{-1} = (g^{-1})^{n_y} \qquad 4.2b$$

This feature, i.e., computing $L_x^{-1}$ and $L_y^{-1}$ without any inversion operation, is used to introduce new countermeasures against DPA attacks by randomizing the projective coordinate system during the main loop of scalar multiplication. In conventional systems, it is well known that changing the projective coordinate system halfway through the scalar multiplication computation requires at least one inversion operation each time we want to change the coordinate system. However, in the method of the present invention, it is possible to convert an elliptic curve point from one projective coordinate system to another during the same scalar multiplication without any inversion operation. The only inversion operation required is for computing $g^{-1}$, which can be computed once and stored for later use for point conversion during the same scalar multiplication.

The method includes two processes for converting an elliptic curve point $P_1 = (X_1, Y_1, Z^{L_{x1}}, Z^{L_{y1}})$ to another projected point $P_2 = (X_2, Y_2, Z^{L_{x2}}, Z^{L_{y2}})$. Both processes convert $P_1$ directly to $P_2$ without any inversion operation; in other words, without the need to calculate the affine coordinates x and y of $P_1$ and then project them to $P_2$. These processes differ in whether the Z-coordinate is calculated or not.

Recall that we have $Z^{L_{x1}}$ and $Z^{L_{y1}}$ in the representation of the point $P_1$ (not the Z-coordinate). The first process is based on calculating the Z-coordinate first and then use it to get $Z^{L_{x2}}$, $Z^{L_{y2}}, X_2$ and $Y_2$. This process requires computing either $L_x^{-1}$ or $L_y^{-1}$. The second process does not require calculating the Z-coordinate. It uses $Z^{L_{x1}}$ and $Z^{L_{y1}}$ to get $Z^{L_{x2}}, Z^{L_{y2}}, X_2$ and $Y_2$ directly without calculating the value of Z. This process requires both $L_x^{-1}$ and $L_y^{-1}$ to be computed. However, whether both $L_x^{-1}$ and $L_y^{-1}$ are required or whether one of them is sufficient, they can be calculated without any inversion operation according to equations 4.2a and 4.2b.

The projecting parameters $L_x$ and $L_y$ are degrees of the Z-coordinate that can be chosen in the range from 1 to N. Based on that, the following Parameterized Transformation Functions are defined:

$$x = \frac{X}{Z^{L_x}} \qquad 4.3a$$

$$y = \frac{Y}{Z^{L_y}} \qquad 4.3b$$

where $0 < L_x \leq N$ and $0 \leq L_y \leq N$.

The method includes equations for elliptic curve point addition and doubling that can be used for any values for $L_x$ and $L_y$, and, hence, the same mathematical formulation can be used to implement point addition and doubling using any projective coordinate. The appropriate projective coordinate is selected based on the values of projecting parameters $L_x$ and $L_y$.

To achieve a higher security level, it is desired to convert a point from one projective coordinate representation to another. Point conversion can be performed at the beginning of the scalar multiplication algorithm, or it could be done in each iteration of the main loop of the scalar multiplication. The main advantage of doing such conversion is to achieve a higher security level by randomizing the projective coordinate system halfway in the scalar multiplication, hence randomizing the computations of the ADD and DBL operations.

Suppose that we have the point $P_1=(X_1,Y_1,Z^{L_{x_1}},Z^{L_{y_1}})$ and we want to convert it to the point $P_2=(X_2,Y_2,Z^{L_{x_2}},Z^{L_{y_2}})$ (target point) by using newly selected projective parameters $L_x$ and $L_y$. In the following, we derive the transformation functions that could be used to transform each coordinate of $P_1$ to the corresponding one of $P_2$ without the need to return back and calculate the affine coordinates and then project the affine point to the new projected point $P_2$. Therefore, we need four formulas to compute $X_2, Y_2, Z^{L_{x_2}}$, and $Z^{L_{y_2}}$ of the target point.

The method for elliptic curve scalar multiplication of the present invention introduces two methods of converting to $P_2$. Both methods convert $P_1$ directly to $P_2$ without the need to calculate the affine coordinates x and y and then project them to $P_2$. However, since we have $Z^{L_{x_1}}$ and $Z^{L_{y_1}}$ in the representation of the point $P_1$ (not the Z-coordinate), the introduced methods differ in whether the Z-coordinate is calculated or not. Point conversion Method 1 is based on calculating the Z-coordinate first and then using it to get $Z^{L_{x_2}}$, $Z^{L_{y_2}}$, $X_2$, $X_2$ and $Y_2$. Point conversion Method 2 does not require calculating the Z-coordinate. It uses $Z^{L_{x_1}}$ and $Z^{L_{y_1}}$ to get the target point instead. The development of point conversion Method 1 will be described first.

The given point is $P_1=(X_1,Y_1,Z^{L_{x_1}},Z^{L_{y_1}})$ and the target of conversion is $P_2=(X_2,Y_2,Z^{L_{x_2}},Z^{L_{y_2}})$. As mentioned before, point conversion Method 1 requires calculating the Z-coordinate. The steps of this method are: (1) calculate the value of the Z-coordinate; (2) randomly select the new values $n_{x_2}$ and $n_{y_2}$ and use them to get $L_{x_2}$ and $L_{y_2}$ by using equations 4.1a and 4.1b; (3) calculate $Z^{L_{x_2}}$ and $Z^{L_{y_2}}$ of $P_2$; and (4) calculate $X_2$ and $Y_2$ of $P_2$. The required formulas for each of these steps are derived below.

Step 1: Calculating the value of the Z-coordinate. First, calculate $L_x^{-1}$ by using $L_x^{-1}=(g^{-1})^{n_x}$. Second, the value of Z can be computed simply by raising $Z^{L_x}$ to the power of $L_x^{-1}$, that is, by applying the following formula:

$$Z = (Z^{L_{x_1}})^{L_{x_1}^{-1}} \qquad 5.1$$

An equivalent step 1 for calculating the value of the Z-coordinate is as follows: First, calculate $L_y^{-1}$ by using $L_y^{-1}=(g^{-1})^{n_y}$. Second, the value of Z can be computed simply by raising $Z^{L_y}$ to the power of $L_y^{-1}$. that is, by applying the following formula:

$$Z = (Z^{L_{y_1}})^{L_{y_1}^{-1}} \qquad 5.2$$

Step 2: Randomly select the new values $n_{x_2}$ and $n_{y_2}$ and apply equations 4.1a and 4.1b to get the new projecting parameters $L_{x_1}$ and $L_{y_1}$.

Step 3: Calculating $Z^{L_{x_2}}$ and $Z^{L_{y_2}}$ of $P_2$. Once the value of Z is known, we can raise it to the new projecting parameters $L_{x_1}$ and $L_{y_1}$ to get $Z^{L_{x_2}}$ and $Z^{L_{y_2}}$ respectively. Therefore, one can write:

$$Z^{L_{x_2}}=(Z)^{L_{x_2}} \qquad 5.3a$$

$$Z^{L_{y_2}}=(Z)^{L_{y_2}} \qquad 5.3b$$

Step 4: Calculating $X_2$ and $Y_2$ of $P_2$. The relation between $X_2$ and $X_1$ is given by:

$$\frac{X_1}{Z^{L_{x_1}}} = \frac{X_2}{Z^{L_{x_2}}},$$

which can be written as:

$$X_2 = X_1 \frac{Z^{L_{x_2}}}{Z^{L_{x_1}}} = X_1 Z^{L_{x_2}-L_{x_1}} \qquad 5.4$$

Therefore, to get $Z^{L_{x_2}-L_{x_1}}$, we only raise the value of Z calculated in step 1 to the power of $L_{x_2}-L_{x_1}$. Note that $L_{x_2}-L_{x_1}$ can be calculated by only one subtraction operation.

Similarly, the relation between $Y_2$ and $Y_1$ is given by:

$$\frac{Y_1}{Z^{L_{y_1}}} = \frac{Y_2}{Z^{L_{y_2}}},$$

which can be written as:

$$Y_2 = Y_1 \frac{Z^{L_{y_2}}}{Z^{L_{y_1}}} = Y_1 Z^{L_{y_2}-L_{y_1}} \qquad 5.5$$

Therefore, to get $Z^{L_{y_2}-L_{y_1}}$, we only raise the value of Z calculated in step 1 to the power of $L_{y_2}-L_{y_1}$. Note that $L_{y_2}-L_{y_1}$ can be calculated by only one subtraction operation.

As mentioned before, point conversion Method 2 does not require calculating the Z-coordinate. It uses $Z^{L_{x_1}}$ and $Z^{L_{y_1}}$ to get the target point directly. The steps of this method are: (1) randomly select the new values $n_{x_1}$ and $n_{y_1}$, and apply equations 4.1a and 4.1b to get the new projecting parameters $L_{x_2}$ and $L_{y_2}$; (2) calculate $Z^{L_{x_2}}$ and $Z^{L_{y_2}}$ of $P_2$; (3) calculate $X_2$ and $Y_2$ of $P_2$. The required formulas for each of these steps are derived below.

Step 1: Randomly select the new values $n_{x_1}$ and $n_{y_1}$ and apply equations 4.1a and 4.1b to get $L_{x_2}$ and $L_{y_2}$.

Step 2: Calculating $Z^{L_{x_2}}$ and $Z^{L_{y_2}}$ of $P_2$. The formula for computing $Z^{L_{x_2}}$ is derived as follows.

$Z^{L_{x_2}}$ can be written as:

$$Z^{L_{x_2}} = \left(Z^{L_{x_1}}\right)^{\frac{L_{x_2}}{L_{x_1}}} = \left(Z^{L_{x_1}}\right)^{L_{x_2} \times L_{x_1}^{-1}} \quad 5.6$$

Therefore, to get $Z^{L_{x_2}}$, we raise $Z^{L_{x_1}}$ to the power of $L_{x_2} \times L_{x_1}^{-1}$. Note that $L_{x_1}^{-1}$ can be computed by using $L_{x_1} = (g^{-1})^{n_x}$.

Similarly, $Z^{L_{y_2}}$ can be computed by:

$$Z^{L_{y_2}} = \left(Z^{L_{y_1}}\right)^{\frac{L_{y_2}}{L_{y_1}}} = \left(Z^{L_{y_1}}\right)^{L_{y_2} \times L_{y_1}^{-1}} \quad 5.7$$

Hence, to get $Z^{L_{y_2}}$, we raise $Z^{L_{y_1}}$ to the power of $L_{y_2} \times L_{y_1}^{-1}$. Note that $L_{y_1}^{-1}$ can be computed by using $L_{y_1}^{-1} = (g^{-1})^{n_y}$.

Step 3: Calculating $X_2$ and $Y_2$ of $P_2$. The relation between $X_2$ and $X_1$ is given by:

$$\frac{X_1}{Z^{L_{x_1}}} = \frac{X_2}{Z^{L_{x_2}}},$$

which can be written as:

$$X_2 = \frac{X_1 \times Z^{L_{x_2}}}{Z^{L_{x_1}}} = X_1 \frac{Z^{L_{x_2}}}{Z^{L_{x_1}}}$$

From equation 5.6, $Z_2^{L_x}$ can be written in terms of $Z_1^{L_x}$ and we can get:

$$X_2 = X_1 \frac{Z^{L_{x_2}}}{Z^{L_{x_1}}}$$

$$= X_1 \frac{\left(Z^{L_{x_1}}\right)^{L_{x_2} \times L_{x_1}^{-1}}}{Z^{L_{x_1}}}$$

$$= X_1 \left(\left(Z^{L_{x_1}}\right)^{L_{x_2} \times L_{x_1}^{-1}} \left(Z^{L_{x_1}}\right)^{-1}\right)$$

and hence:

$$X_2 = X_1 \left(\left(Z^{L_{x_1}}\right)^{L_{x_2} \times L_{x_1}^{-1} - 1}\right) \quad 5.8$$

Therefore, to get $X_2$, we raise $Z^{L_{x_1}}$ to the power of $L_{x_2} \times L_{x_1}^{-1} - 1$. Similarly, the relation between $Y_2$ and $Y_1$ is given by:

$$\frac{Y_1}{Z^{L_{y_1}}} = \frac{Y_2}{Z^{L_{y_2}}}.$$

Therefore, one can write $$Y_2 = \frac{Y_1 \times Z^{L_{y_2}}}{Z^{L_{y_1}}} = Y_1 \frac{Z^{L_{y_2}}}{Z^{L_{y_1}}}.$$

From equation 5.7, $Z^{L_{y_2}}$ can be written in terms of $Z^{L_{y_1}}$ and we can get:

$$Y_2 = Y_1 \frac{Z^{L_{y_2}}}{Z^{L_{y_1}}}$$

$$= Y_1 \frac{\left(Z^{L_{y_1}}\right)^{L_{y_2} \times L_{y_1}^{-1}}}{Z^{L_{y_1}}}$$

$$= Y_1 \left(\left(Z^{L_{y_1}}\right)^{L_{y_2} \times L_{y_1}^{-1}} \left(Z^{L_{y_1}}\right)^{-1}\right)$$

and hence $$Y_2 = Y_1 \left(\left(Z^{L_{y_1}}\right)^{L_{y_2} \times L_{y_1}^{-1} - 1}\right) \quad 5.9$$

Therefore, to get $Y_2$, we raise $Z^{L_{y_1}}$ to the power of $L_{y_2} \times L_{y_1} - 1$.

Point addition according to the method of elliptic curve scalar multiplication will now be described. Let $P=(x_1,y_1)$ and $Q=(x_2,y_2)$ be two points satisfying the elliptic curve equation. Then the affine coordinates of the point $R=(x_3,y_3)=P+Q$ is given by:

$$x_3 = \lambda^2 - x_1 - x_2 \quad 5.10a$$

$$y_3 = \lambda(x_1 - x_3) - y_1 \quad 5.10b$$

where:

$$\lambda = \frac{y_2 - y_1}{x_2 - x_1}$$

The parameterized transformation functions shown in equations 4.3a and 4.3b are used to get the parameterized projective coordinates $(X_3, Y_3, Z_3^{L_x}, Z_3^{L_y})$ of the point R according to equations 5.10a and 5.10b. Listed below are formulas for addition according to the method of the present invention, which are derived by substituting the parameterized projective coordinates into equations 5.10a and 5.10b and simplifying algebraically.

$$X_3 = U^2 Z_1^{3L_x - 2L_y} Z_2^{3L_x - 2L_y} - SV^2 \quad 5.11a$$

$$Y_3 = U(X_1 V^2 Z_2^{L_x} - U^2 Z_1^{3L_x - 2L_y} Z_2^{3L_x - 2L_y} - SV^2) - Y_1 V^3 Z_2^{L_y} = U(V^2(X_1 Z_2^{L_x}) - X_3) - V(Y_1 Z_2^{L_y}) \quad 5.11b$$

$$Z_3^{L_x} = V^2 Z_1^{L_x} Z_2^{L_x} \quad 5.11c$$

$$Z_3^{L_y} = V^3 Z_1^{L_y} Z_2^{L_y} \quad 5.11d$$

where $$U = Y_2 Z_1^{L_y} = Y_1 Z_2^{L_y}, V = X_2 Z_1^{L_x} - X_1 Z_2^{L_x} \text{ and } S = X_2 Z_1^{L_x} + X_1 Z_2^{L_x}$$

Point doubling according to the method of elliptic curve scalar multiplication will now be described. Let $P=(x_1, y_1)$ be a point satisfying the elliptic curve equation. Then the affine coordinates of the point $R=(x_3, y_3)=2P$ is given by:

$$x_3 = \lambda^2 - 2x_1 \quad \text{5.12a}$$

$$y_3 = \lambda(x_1 - x_3) - y_1 \quad \text{5.12b}$$

where:

$$\lambda = \frac{3x_1^2 + a}{2y_1}$$

The parameterized transformation functions shown in equations 4.3a and 4.3b are used to get the parameterized projected coordinates $(X_3, Y_3, Z_3^{L_x}, Z_3^{L_y})$ of the point R according to equations 5.12a and 5.12b. Listed below are the final formulas of the point doubling operation, which are derived by substituting the parameterized projective coordinates into equations 5.12a and 5.12b and simplifying algebraically.

$$X_3 = w^3 Z_1^{2L_y} - 8 X_1 Z_1^{3L_x} Y_1^2 \quad \text{5.13a}$$

$$Y_3 = w Z_1^{2L_y}(4 X_1 Y_1^2 Z_1^{3L_x} - w^2 Z_1^{2L_y} + 8 X_1 Z_1^{3L_x} Y_1^2) - 8 Z_1^{6L_x} Y_1^4 \quad \text{5.13b}$$

$$Z_3^{L_x} = 4 Z_1^{4L_x} Y_1^2 \quad \text{5.13c}$$

$$Z_3^{L_y} = 8 Z_1^{6L_x} Z_1^{L_y} Y_1^3 \quad \text{5.13d}$$

where:

$$w = 3 X_1^2 + a Z_1^{2L_x}$$

Elliptic curve scalar multiplication, KP, can be computed using any of Algorithms 1-5, with or without Coron's countermeasures. Using projective coordinates is strongly recommended to avoid the field inversion operations (or equivalently, division) while computing KP.

Many countermeasures against differential power analysis attacks rely on randomized projective coordinates. But all these countermeasures depend on a predetermined single or a small set of projective coordinate systems that are decided at the design stage.

In the method of the present invention, countermeasures are proposed that use Runtime Randomization of Parameterized Projective Coordinates (RRPPC). That is, a new projective coordinate system is set up by selecting new projecting parameters $L_x$ and $L_y$ at random. Actually, selecting new projecting parameters is done via selecting the powers $n_x$ and $n_y$, and then $L_x$ and $L_y$ according to equations 4.1a and 4.1 b. A common property of the proposed countermeasures is that the projective coordinate system is selected by the crypto-device at random, i.e., it is not predetermined. They differ in the time when to invoke changing the projective coordinate system and the method used to convert a point from one projective coordinate representation to another. Changing the projective coordinate system could be invoked in the beginning of the scalar multiplication before entering the main for loop, or it could be invoked a random number of times inside the main for loop of the scalar multiplication algorithm. In the following subsections, three countermeasures based on the RRPPC are presented. However, the proposed countermeasures can work with any scalar multiplication algorithm.

Countermeasure 1 is based on selecting the projecting parameters $L_x$ and $L_y$ values at the beginning of the scalar multiplication and before entering the main for loop. This countermeasure does not require any inversion operation, since the projective system is set up at the beginning of the scalar multiplication and remains fixed during the main for loop. Countermeasure 1 uses the addition formulas shown in equations 5.11a-5.11d and the doubling formulas shown in equations 5.13a-5.13d. The steps of Countermeasure 1 are shown in Algorithm 6.1 and can be summarized as follows:

Step 1: Randomly select the power $n_x$ and compute the value of $L_x$ by using equation 4.1a.

Step 2: Randomly select the power $n_y$ and compute $L_y$ value by using equation 4.1 b.

Step 3: Project the base point P to the point $\tilde{P}$ by using the parameterized transformation functions shown in equations 4.3a and 4.3b, referred to in the algorithm as the Runtime Randomization of Parameterized Projective Coordinates (RRPPC) functions. The projected point P will be used as input to the scalar multiplication algorithm. The output of the scalar multiplication algorithm is the point Q.

Step 4: The scalar multiplication algorithm may be any one of Algorithms 1 through 5, or any other scalar multiplication algorithm. Since scalar multiplication will use formulas 5.11a-5.11d and 5.13a-5.13d for addition and doubling operations, respectively, the resultant point, Q, will be in projective coordinate representation. Step 5 brings the point Q back to the affine coordinate representation by applying the reverse transformation functions (RRPPC$^{-1}$) of the transformation functions shown in equations 4.3a and 4.3b.

---

Algorithm 6.1: Countermeasure 1
INPUT K, P
OUTPUT KP

1. Select random value for $n_x$ and compute $L_x$
2. Select random value for $n_y$ and compute $L_y$
3. $\tilde{P}$ = RRPPC(P)
4. Any scalar multiplication algorithm
       For ADD Use Equations 5.11a-5.11d
       For DBL Use Equations 5.13a-5.13d
       Q ← Output of the algorithm
5. R = RRPPC$^{-1}$(Q)
return (R)

---

Countermeasure 2 is based on randomly changing the projective coordinate system during the scalar multiplication algorithm. In other words, this countermeasure is based on converting the resultant point of each scalar multiplication from its projective coordinate system to another (random) one. Countermeasure 2 uses point conversion Method 1 (equations 5.1 through 5.5) and uses the addition formulas shown in equations 5.11a-5.11d and the doubling formulas shown in equations 5.13a-5.13d. The steps of Countermeasure 2 are shown in Algorithm 6.2 and can be summarized as follows:

Step 1: Calculate the inverse of the base value, $g^{-1}$.

Step 2: Project the base point P to the point $\tilde{P}$ by using the parameterized transformation functions shown in equations 4.3a and 4.3b, referred to in the algorithm as the Runtime Randomization of Parameterized Projective Coordinates (RRPPC) functions. The projected point P will be used as input to the scalar multiplication algorithm. The output of the scalar multiplication algorithm is the point Q.

Steps 3-4: The scalar multiplication algorithm may be any one of Algorithms 1 through 5, or any other scalar multiplication algorithm. Inside the scalar multiplication main loop, convert the resultant point of each iteration to a new projected one by using point conversion Method 1.

Step 5: Since the scalar multiplication will use equations 5.11a-5.11d and 5.13a-5.13d for addition and doubling operations, respectively, the resultant point, Q, will be in projective coordinates. Step 5 brings the point Q back to affine coordinates representation by applying the reverse transformation functions (RRPPC$^{-1}$) of the transformation functions shown in equations 4.3a and 4.3b.

---
Algorithm 6.2: Countermeasure 2
INPUT K, P
OUTPUT KP
---

1. Compute the value of g$^{-1}$
2. P̃ =RRPPC(P)
3. Main scalar multiplication loop as follows:
4. Any scalar multiplication algorithm
    Convert current point to another projected one using Method 1
        For ADD use equations 5.11a-5.11d
        For DBL use equations 5.13a-5.13d
        Q←Output of the algorithm
5. R=RRPPC$^{-1}$(Q)
6. return(R)

---

Countermeasure 3 is based on randomly changing the projective coordinate system during the scalar multiplication algorithm. In other words, this countermeasure is based on converting the resultant point of each scalar multiplication from its projective coordinate system to another (random) one. Countermeasure 3 uses point conversion Method 2 (equations 5.6 through 5.9) and uses the addition formulas shown in equations 5.11a-5.11d and the doubling formulas shown in equations 5.13a-5.13d. The steps of Countermeasure 3 are shown in Algorithm 6.3 and can be summarized as follows:

Step 1: Calculate the inverse of the base value, g$^{-1}$.

Step 2: Project the base point P to the point P̃ by using the parameterized transformation functions shown in equations 4.3a and 4.3b, referred to in the algorithm as the Runtime Randomization of Parameterized Projective Coordinates (RRPPC) functions. The projected point P̃ will be used as input to the scalar multiplication algorithm. The output of the scalar multiplication algorithm is the point Q.

Step 3: Inside the scalar multiplication main loop, convert the resultant point of each iteration to a new projected one by using point conversion Method 2.

Step 4: The scalar multiplication algorithm may be any one of Algorithms 1 through 5, or any other scalar multiplication algorithm. Since scalar multiplication will use equations 5.11a-5.11d and 5.13a-5.13d for addition and doubling operations, respectively, the resultant point, Q, will be in projective coordinate representation. Step 5 brings the point Q back to the affine coordinates representation by applying the reverse transformation functions (RRPPC$^{-1}$) of the transformation functions shown in equations 4.3a and 4.3b.

---
Algorithm 6.3: Countermeasure 3
INPUT K, P
OUTPUT KP
---

1. Compute the value g$^{-1}$
2. P̃ =RRPPC(P)
3. Main scalar multiplication loop as follows:
4. Any scalar multiplication algorithm
    Convert current point to another projected one using Method 2
        For ADD use equations 5.11a-5.11d
        For DBL use equations 5.13a-5.13d
    Q←Output of the algorithm
5. R=RRPPC$^{-1}$(Q)
return (R)

---

In conclusion, the method for elliptic curve scalar multiplication increases the efficiency of elliptic curve cryptosystems used for communications over an insecure communications channel. The insecure communications channel may be, e.g., a telephone network, such as a cellular telephone network; the Internet, where cryptographic systems may be employed for security in e-commerce payment transactions conducted through a web browser via Hypertext Transfer Protocol (HTTP), or for the security of electronic mail messages conducted via Simple Mail Transfer Protocol (SMTP) and POP3 protocols, or for confidential file transfers via File Transfer Protocol (FTP); or for smart card transactions between a smart card (a plastic card having an embedded microprocessor and limited memory) and a server via a smart card reader and transmission line for credit card or bank transactions, identification cards, access cards, and the like.

Further, the method may be employed for key exchange in a public-key cryptosystem, for digital signatures, and for the encryption of plaintext messages or data, all of which require scalar multiplication of the form kP, wherein k is a scalar and P is a point on an elliptic curve. The method of the present invention may be particularly useful in connection with smart cards, wherein the small key size and limited data transfer (identification data, account numbers, etc.) make elliptic curve cryptographic methods particularly advantageous, although the quicker execution time and lower memory storage requirements of the method enhance data encryption over any insecure communications channel.

In brief, the method for elliptic curve scalar multiplication in an elliptic curve cryptosystem implemented over an insecure communications channel comprises the steps of: (a) independently selecting integer exponents, $n_x$ and $n_y$; (b) separately raising a common base, g, to the $n_x$ power and to the $n_y$ power to form independent x-coordinate and y-coordinate transform parameters $L_x=g^{n_x}$ and $L_y=g^{n_y}$, respectively, where $L_x \geq 2$ and $L_y \geq 2$; (c) representing coordinates of a point P=(x,y) on an elliptic curve of the form $F(x,y)=y^2-x^3-ax-b=0$ defined over a finite field as projective coordinates according to transforms $$x = \frac{X}{Z^{L_x}}$$

and $$y = \frac{Y}{Z^{L_y}},$$

respectively; and (d) adding together K copies of the point P(X,Y) to obtain the scalar multiplication product KP.

It will be understood that, although the powers $n_x$ and $n_y$ might be manually selected by the user, preferably the powers are automatically generated by a random number generator circuit or software module operating under control of a processor. It will be further understood that the base g is preferably predetermined according to the cryptosystem application. The method may then further comprise the steps of: (e) pre-computing the inverse of the base, $g^{-1}$, (f) storing $g^{-1}$, (g) retrieving $g^{-1}$, and (h) substituting $L_x^{-1}=(g^{-1})^{n_x}$ and $L_y^{-1}=(g^{-1})^{n_y}$ whenever required in order to avoid inversion operations.

Hence, the method may include the step of converting the scalar multiplication product from parameterized projective coordinates $P(X,Y,L^x,L^y)$ to affine coordinates $P(x,y)$, using steps (e)-(h) to perform any required inversions.

Step (d) (adding together K copies of the point P(x,y)) may comprise following the steps of any one of Algorithms 1 through 5. Step (d) may further comprise implementing any of the countermeasures by following the steps of Algorithms 61. through 6.3.

The present invention would also extend to any cryptographic device programmed to, or having dedicated circuits configured to, execute the steps of the method, including a computer, a microprocessor or microcontroller, a digital signal processor, an Application Specific Integrated Circuit (ASIC), and may be implemented in a computer, telephone, radio transceiver, smart card, or any other communications device. Further, the present invention extends to any computer readable media having instructions stored thereon that, when loaded into main memory and executed by a processor, carries out the steps of the method, including: integrated circuit memory chips; hard disk drives; floppy disk drives; magnetic or optical memory media, including compact disks (CD) and digital versatile disks (DVD); and any other media capable of storing instructions executable by a processor when loaded into main memory.

It is to be understood that the present invention is not limited to the embodiments described above, but encompasses any and all embodiments within the scope of the following claims.

We claim:

1. A method for elliptic curve scalar multiplication in an elliptic curve cryptosystem implemented over an insecure communications channel using a cryptographic device configured to carry out the steps of the method, comprising the steps of:
   (a) independently selecting integer exponents, $n_x$ and $n_y$;
   (b) separately raising a common base, g, to the $n_x$ power and to the $n_y$ power to form independent x-coordinate and y-coordinate transform parameters $L_x=g^{n_x}$ and $L_y=g^{n_y}$, respectively, where $L_x \geq 2$ and $L_y \geq 2$;
   (c) representing coordinates of a point P=(x,y) on an elliptic curve of the form $F(x,y)=y^2-x^3-ax-b=0$ defined over a finite field as projective coordinates according to transforms $$x = \frac{X}{Z^{L_x}}$$
   and
   $$y = \frac{Y}{Z^{L_y}},$$

respectively; and
   (d) adding together K copies, K being a scalar, of the point $P(X,Y,Z^{L_x},Z^{L_y})$ to obtain the scalar multiplication product KP.

2. The method for elliptic curve scalar multiplication according to claim 1, further comprising the steps of:
   (e) pre-computing the inverse of the base, $g^{-1}$;
   (f) storing $g^{-1}$;
   (g) retrieving $g^{-1}$; and
   (h) substituting $L_x^{-1}=(g^{-1})^{n_x}$ and $L_y^{-1}=(g^{-1})^{n_y}$ whenever required in order to avoid inversion operations.

3. The method for elliptic curve scalar multiplication according to claim 2, further comprising the step of converting the scalar multiplication product from parameterized projective coordinates $P(X,Y,L^x,L^y)$ to affine coordinates $P(x,y)$, using steps (e)-(h) to perform any required inversion operations.

4. The method for elliptic curve scalar multiplication according to claim 3, wherein step (d) comprises performing a plurality of point addition and point doubling operations in an order corresponding to a binary representation of the scalar, K.

5. The method for elliptic curve scalar multiplication according to claim 4, wherein the order corresponds to the most significant digit to the least significant digit in the binary representation of the scalar, K.

6. The method for elliptic curve scalar multiplication according to claim 4, wherein step (d) further comprises at least one dummy addition when a corresponding digit of the scalar, K, is equal to zero in order to defeat a differential power analysis attack.

7. The method for elliptic curve scalar multiplication according to claim 4, wherein the order corresponds to the least significant digit to the most significant digit in the binary representation of the scalar, K.

8. The method for elliptic curve scalar multiplication according to claim 3, further comprising the steps of keeping the scalar private and making the point P(x,y) and the scalar multiplication product, KP, public for establishing elliptic curve public-key agreement.

9. The method for elliptic curve scalar multiplication according to claim 3, further comprising the steps of:
   embedding a plaintext message onto a point on the elliptic curve to form a message point; and
   adding the message point to the scalar multiplication product, KP, in order to encrypt the plaintext message.

10. The method for elliptic curve scalar multiplication according to claim 1, wherein step (a) comprises automatically generating $n_x$ and $n_y$ from a random number generator.

11. The method for elliptic curve scalar multiplication according to claim 1, wherein $L^x<N$ and $L^y<N$, where N is the number of bits in a binary representation of the coordinates x and y of point P.

12. The method for elliptic curve scalar multiplication according to claim 1, wherein step (d) comprises a plurality of point addition and point doubling operations in an order corresponding to a binary representation of the scalar, K, and wherein steps (a), (b), and (c) are performed prior to step (d).

13. The method for elliptic curve scalar multiplication according to claim 1, wherein step (d) comprises performing a plurality of point addition and point doubling operations in an order corresponding to a binary representation of the scalar, K, further comprising the steps of:
   (j) pre-computing the inverse of the base, $g^{-1}$;
   (k) for each digit in the binary representation of the scalar, K, before performing the point addition and point doubling operations for the digit, converting a current representation of the coordinates $(X_1, Y_1, Z^{L_n}, Z^{L_n})$ to new parameterized projective coordinates $(X_2, Y_2, Z^{L_n}, Z^{L_n})$, including:
(i) calculating the value of Z;
(ii) randomly selecting new exponents $n_{x_2}$ and $n_{y_2}$, respectively;
(iii) forming new transform parameters $L_{x_2} = g^{n_x}$ and $L_{y_2} = g^{L_n}$, respectively;
(iv) raising Z to the power of $L_{x_2}$ and $L_{y_2}$, respectively; and
(v) calculating the values of $X_2$ and $Y_2$ from $Z^{L_n}$ and $Z^{L_n}$, respectively, using $L_x^{-1} = (g^{-1})^{n_x}$ and $L_y^{-1} = (g^{-1})^{n_y}$ to avoid inversion operations; and
(l) after step (d), transforming the scalar multiplication product from parameterized projective coordinates to affine coordinates, using $L_x^{-1} = (g^{-1})^{n_x}$ and $L_y^{-1} = (g^{-1})^{n_y}$ to avoid inversion operations.

14. The method for elliptic curve scalar multiplication according to claim 1, wherein step (d) comprises performing a plurality of point addition and point doubling operations in an order corresponding to a binary representation of the scalar, K, further comprising the steps of:
(m) pre-computing the inverse of the base, $g^{-1}$;
(n) for each digit in the binary representation of the scalar, K, before performing the point addition and point doubling operations for the digit, converting a current representation of the coordinates $(X_1, Y_1, Z^{L_n}, Z^{L_n})$ to new coordinates $(X_2, Y_2, Z^{L_n}, Z^{L_n})$, including:
(i) randomly selecting new exponents $n_{x_2}$ and $n_{y_2}$, respectively;
(ii) forming new transform parameters $L_{x_2} = g^{n_x}$ and $L_{y_2} = g^{L_n}$ respectively;
(iii) raising $Z^{L_n}$ to the power of $L_{x_2} \times L_{x_1}^{-1} = L_{x_2}(g^{-1})^x$ and $Z^{L_n}$ to the power of $L_{y_2} \times L_{y_1}^{-1} = L_{y_2} \times (g^{-1})^y$, respectively, in order to obtain $Z^{L_n}$ and $Z^{L_n}$ while avoiding inversion operations; and
(v) calculating the values of $X_2$ and $Y_2$ from $Z^{L_n}$ and $Z^{L_n}$, respectively, using $L_x^{-1} = (g^{-1})^{n_x}$ and $L_y^{-1} = (g^{-1})^{n_y}$ to avoid inversion operations; and
(o) after step (d), transforming the scalar multiplication product from parameterized projective coordinates to affine coordinates, using $L_x^{-1} = (g^{-1})^{n_x}$ and $L_y^{-1} = (g^{-1})^{n_y}$ to avoid inversion operations.

15. A cryptographic device for elliptic curve scalar multiplication in an elliptic curve cryptosystem implemented over an insecure communications channel, the device comprising:
(a) means for independently selecting integer exponents, $n_x$ and $n_y$;
(b) means for separately raising a common base, g, to the $n_x$ power and to the $n_y$ power to form independent x-coordinate and y-coordinate transform parameters $L_x = g^{n_x}$ and $L_y = g^{n_y}$, respectively, where $L_x \geq 2$ and $L_y \geq 2$;
(c) means for representing coordinates of a point P=(x,y) on an elliptic curve of the form $F(x,y) = y^2 - x^3 - ax - b = 0$ defined over a finite field as projective coordinates according to transforms $$x = \frac{X}{Z^{L_x}}$$
and
$$y = \frac{Y}{Z^{L_y}},$$

respectively;
(d) means for adding together K copies, K being a scalar, of the point $P(X,Y,Z^{L_x},Z^{L_y})$ to obtain the scalar multiplication product KP;

(e) means for pre-computing the inverse of the base, $g^{-1}$, storing $g^{-1}$, retrieving $g^{-1}$, and substituting $L_x^{-1} = (g^{-1})^{n_x}$ and $L_y^{-1} = (g^{-1})^{n_y}$ whenever required in order to avoid inversion operations; and
(f) means for converting the scalar multiplication product from parameterized projective coordinates $P(X,Y,L^x,L^y)$ to affine coordinates P(x,y).

16. The cryptographic device according to claim 15, wherein the device comprises a computer having a processor for carrying out means (a) through (f).

17. The cryptographic device according to claim 15, wherein the device comprises a telephone having a processor for carrying out means (a) through (f).

18. The cryptographic device according to claim 15, wherein the device comprises a smart card having a processor for carrying out means (a) through (f).

19. The cryptographic device according to claim 15, wherein the device comprises an application specific integrated circuit (ASIC) having circuitry for carrying out means (a) through (f).

20. A computer product comprising a non-transitory medium readable by a computer, the computer having a processor and an area of main memory, the medium having stored thereon a set of instructions, including:
(a) a first set of instructions which, when loaded into main memory and executed by the processor, causes the processor to independently select integer exponents, $n_x$ and $n_y$;
(b) a second set of instructions which, when loaded into main memory and executed by the processor, causes the processor to separately raise a common base, g, to the $n_x$ power and to the $n_y$ power to form independent x-coordinate and y-coordinate transform parameters $L_x = g^{n_x}$ and $L_y = g^{n_y}$, respectively, where $L_x \geq 2$ and $L_y \geq 2$;
(c) a third set of instructions which, when loaded into main memory and executed by the processor, causes the processor to represent coordinates of a point P=(x,y) on an elliptic curve of the form $F(x,y) = y^2 - x^3 - ax - b = 0$ defined over a finite field as projective coordinates according to transforms $$x = \frac{X}{Z^{L_x}}$$
and
$$y = \frac{Y}{Z^{L_y}},$$

respectively;
(d) a fourth set of instructions which, when loaded into main memory and executed by the processor, causes the processor to add together K copies, K being a scalar, of the point $P(X,Y,Z^{L_x},Z^{L_y})$ to obtain the scalar multiplication product KP;
(e) a fifth set of instructions which, when loaded into main memory and executed by the processor, causes the processor to pre-compute the inverse of the base, $g^{-1}$, store $g^{-1}$, retrieve $g^{-1}$, and substitute $L_x^{-1} = (g^{-1})^{n_x}$ and $L_y^{-1} = (g^{-1})^{n_y}$ whenever required in order to avoid inversion operations; and
(f) a sixth set of instructions which, when loaded into main memory and executed by the processor, causes the processor to convert the scalar multiplication product from parameterized projective coordinates $P(X,Y,L^x,L^y)$ to affine coordinates P(x,y).

* * * * *